United States Patent Office 3,147,209
Patented Sept. 1, 1964

3,147,209
CATALYST DEMETALLIZATION
Henry Erickson, Park Forest, Ill., and Howard G. Russell, Munster, Ind., assignors, by mesne assignments, to Sinclair Research, Inc., New York, N.Y., a corporation of Delaware
No Drawing. Filed Sept. 12, 1960, Ser. No. 55,129
12 Claims. (Cl. 208—120)

This invention is an improvement in catalytic treatment of hydrocarbon oils and more particularly is a process for removing one or more of nickel, iron and vanadium from a synthetic gel hydrocarbon conversion catalyst which has been contaminated with nickel, iron and/or vanadium by use in the high temperature catalytic conversion of hydrocarbon feedstocks containing these metals. The invention may be used as part of an overall metals-removal procedure employing a plurality of processing steps to increase the amount of nickel or other metal contaminants removed by the procedure.

The invention comprises sulfiding the poisoned catalyst outside the hydrocarbon conversion system and contacting the sulfided metal contaminated catalyst at a moderately elevated temperature with an oxygen-containing gas-steam mixture to convert the metal sulfides to sulfates or other water-soluble or dispersible form and subsequently removing the metals in a washing operation employing an aqueous medium.

Catalytically promoted methods for the chemical conversion of hydrocarbons include cracking, hydrocracking, reforming, hydroforming, etc. Such reactions generally are performed at elevated temperatures, for example, about 300–1200° F., more often about 600–1000° F. Feedstocks to these processes comprise normally liquid and solid hydrocarbons which at the temperature of the conversion reaction are generally in the fluid, i.e., in the liquid or vapor state, and the products of the conversion frequently are lower boiling materials. In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 850–1000° F., preferably about 900–975° F., at pressures up to about 100 p.s.i.g., preferably about atmospheric to about 30 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Silica-based cracking catalysts, including naturally occurring activated clays and synthetically prepared composites, have long been recognized as useful in catalytically promoting hydrocarbon conversion reactions. Such siliceous catalysts contain silica and frequently one or more promoting metal oxides. In clays, the promoting metal oxide is predominantly alumina. Active synthetic cracking catalysts are generally gels or gelatinous precipitates and include silica-alumina, silica-zirconia, and silica-magnesia, as well as ternary combinations such as silica-alumina-zirconia, and silica-alumina magnesia. Popular synthetic gel cracking catalysts generally contain about 10–30% alumina. Two such catalysts are "Aerocat" which contains about 13% $Al_2O_3$ and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite.

Synthetic cracking catalysts may be prepared by various well known methods such as by cogelation or coprecipitation of the silica and metal oxide, or by milling together the separately precipitated or gelled components. Alternatively, the promoting metal oxide may be combined with a previously formed siliceous gel utilizing impregnation techniques. The present invention, however, is not limited to a catalyst prepared by any particular method but it is of general application to synthetic gel hydrocarbon conversion catalysts. These synthetic gel-type catalysts are spray or flash dried and may be activated or calcined before use.

The physical form of the catalyst varies with the type of manipulative process to which it will be exposed. In circulating catalyst systems, such as those of the fluid catalytic and "TCC" processes, catalyst moves through a reaction zone and then through a regeneration zone. In the fluid process, gases are used to convey the catalyst which is in the form of a fine powder, generally in a size range of about 20–150 microns. In the "TCC" or "Thermofor" process the catalyst is in the form of beads which are conveyed by elevators or gas streams. Generally these beads may range in size up to about ½ inch in diameter. When fresh, the minimum sized bead is generally about ⅛ inch. Other types of process use other forms of catalyst such as tablets or extruded pellets.

Commercial catalytic cracking is carried out by contacting a hydrocarbon charge in the vapor or liquid state with a catalyst of the foregoing type under conditions of temperature, pressure and time to achieve substantial conversion of the charge to lower boiling hydrocarbons. A metal contaminant may be introduced with the charge stock or it may be eroded from the equipment. The presence of a metal contaminant in the feed to the conversion system results in the deposition of metal contaminants on the silica-based cracking catalyst employed. Although referred to as "metals," these catalyst contaminants may be in the form of free metals or relatively non-volatile metal compounds. It is to be understood that the term "metal" used herein refers to either form. The presence of such contaminants as nickel, iron, vanadium and copper are highly detrimental to the efficiency of catalysts, causing decreased activity and excessive coke formation during cracking reactions. In fact, commercial experience with such a poisoned catalyst shows gasoline yields based on cracking feed disappearance to lighter materials dropped from 93 to 82% while the laboratory-measured coke factor of the catalyst rose from 1.0 to 3.0. Furthermore, since the major portion of the catalyst remains in the cracking system over an extended period of time, the amount of metal contaminant gradually builds up to such a point that further contact of the cracking charge with the catalyst becomes an uneconomical operation.

The poisoning effects of metal contaminants on synthetic gel hydrocarbon conversion catalysts have heretofore been recognized in the art. Various techniques have been suggested to remove the metal contaminants, generally involving somewhat drastic measures tending to jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253; 2,488,718; 2,488,744; 2,668,798; and 2,693,455; the process of this invention is effective to remove nickel, iron and vanadium without endangering the expensive catalyst.

In this invention the hydrocarbon petroleum oils utilized as feedstock for a conversion process may be of any desired type normally utilized in catalytic conversion operations. The catalyst may be used as a fixed, moving or fluidized bed or may be in a more dispersed state. For typical operations, the catalytic cracking of the hydrocarbon feed would normally result in a conversion of about 50 to 60% of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure.

In this invention the nickel, iron and/or vanadium contaminants on a sulfided, poisoned synthetic gel silica-based catalyst, are converted to sulfate or other forms dispersible in a later aqueous wash by contact with an oxygen-containing gas-steam mixture at a moderately elevated temperature. Oxidation is followed by washing off these dispersible metal compounds by a liquid aqueous medium which preferably is somewhat acidic.

The conversion of the contaminating metals in the catalyst to sulfides is disclosed in copending applications Serial No. 763,834, filed September 29, 1958, and Serial No. 842,618, filed September 28, 1959, and can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor is performed at an elevated temperature generally in the range of about 500–1600° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by the use of a partial vacuum or by diluting the vapor with inert gas such as nitrogen or hydrogen. The time of contact may vary on the basis of the temperature and pressure chosen and other factors such as the amount of metal to be removed. The sulfiding may be effectively performed in about a quarter of an hour or may run for, say up to about 6 hours but little or no advantage is derived from extending contact times beyond 6 hours at any temperature. The sulfiding step performs the function not only of supplying a sulfur-containing metal compound which may be easily converted to the sulfate or other dispersible form according to the process of this invention but also appears to concentrate some metal poisons such as nickel at the surface of the catalyst. Temperatures of about 900 to 1200° F. and pressures approximating 1 atmosphere or less seem near optimum for sulfiding and this treatment often continues for at least 1 or 2 hours, depending on the manner of contacting the catalyst.

In this invention the sulfided catalyst is oxidized at a moderately elevated temperature with a mixture of oxygen-containing gas and steam. The oxygen may be supplied as such or in a mixture with an inert gas such as nitrogen. The preferred source of the molecular oxygen is air and the oxygen in the mixture is present in an amount sufficient to convert effectively the metal contaminant sulfide to the sulfate or other water-dispersible form. Effective amounts of oxygen in the treating gas may be from trace amounts, say of about 0.01% or more, to about 10% and is preferably supplied in concentrations of about 0.5 to 7% when supplied as air. Steam is effectively supplied in concentrations of about 50% or more and is preferably supplied in concentrations of about 65 to 95%, the remainder of the oxidizing gas over and above the steam and oxygen contents, if any, can be inert gases. While atmospheric pressure is preferred, pressures above atmospheric may be used but the additional expense incurred for pressure equipment usually does not justify such pressures. The time of contact of the steam-oxygen-containing gas mixture with the sulfided catalyst will vary with the metals content to be removed from the catalyst and may be in a range of about 5 minutes to 12 hours or more. The temperature of the oxidation is likewise variable within a wide range. Temperatures of about 220–1150° F. may be used with advantage while temperatures of about 400–600° F. are preferable for the conversion of nickel when a 90–10 steam-air mixture is used. Oxidation at such conditions is frequently complete within a period of about 15–30 minutes.

After the oxidation of these poisoning metals, nickel, iron and/or vanadium, to sulfate or other water-dispersible form, the catalyst is washed with an aqueous medium, to remove the metal compound. An acid medium is preferred and the acidity of the aqueous medium may be brought about, at least initially, by the presence of an acid-acting sulfur salt or other acidic material entrained on the catalyst. The aqueous medium can contain extraneous ingredients in trace amounts, so long as the medium is essentially water and the extraneous ingredients do not interfere with demetallization or adversely affect the properties of the catalyst. The acidity may also be attained by the addition to the wash solution of mineral acids whose dilute aqueous solutions exhibit marked dissociation such as HCl, HBr, $H_2SO_4$ or $HNO_3$. $HNO_3$ is the preferred acidifying agent. It has been found that a wash slurry containing about 5–15% solids and about three to ten pounds of nitric acid per ton of catalyst effectively removes the metal contaminants. The presence of the acid in the wash solution probably serves primarily to inhibit hydrolysis of the soluble heavy metal compounds formed by the oxidation of the metal sulfides; the amount of acid employed need not be limited beyond that necessary to inhibit this hydrolysis. Ambient temperatures can be used in the wash but temperatures of about 150° F. to the boiling point of water and agitation are helpful in increasing the dispersibility of the nickel, iron, and/or vanadium materials. Pressures above atmospheric may be used but the results usually do not justify the additional equipment.

After the wash in the aqueous medium, or after the final treatment which may be used in the catalyst demetallization procedure, the catalyst is conducted to its conversion system, for instance, to the conversion reactor or the catalyst regenerator, although it may be desirable first to dry the catalyst filter cake or filter cake slurry at say about 250 to 450° F. and also, prior to reusing the catalyst in the conversion operation it can be calcined, say at temperatures usually in the range of about 700 to 1300° F. Prolonged calcination of the catalyst at above about 1100° F. may sometimes be disadvantageous. Calcination removes free water, if any be present, and perhaps some but not all of the combined water, and leaves the catalyst in an active state without undue sintering of its surface. Inert gases frequently may be employed after contact with reactive vapors to remove any of these vapors entrained in the catalyst or to purge the catalyst of reaction products.

The process of this invention which produces significant removal of contaminants, especially nickel, by withdrawing the metal contaminated catalyst from the conversion system, sulfiding, contacting with a mixture of oxygen-containing gas and steam and washing with an aqueous medium before returning the catalyst to the hydrocarbon conversion system, can be used alone or in conjunction with other procedures which may be practiced primarily for removal of other contaminants, e.g., vanadium. Such other procedures may or may not also effect further nickel, and/or iron removal. In a typical procedure for vanadium removal the metal contaminated catalyst is regenerated for substantial carbon removal then treated at an elevated temperature with molecular oxygen-containing gas as described in copending application Serial No. 19,313, filed April 1, 1960, now abandoned, and finally subjected to a basic aqueous wash as described in copending application Serial No. 39,810, filed June 30, 1960. It has further been found that treatment of a metals contaminated catalyst with a chlorinating agent at a moderately elevated temperature is of value in removing vanadium and iron contaminants from the catalyst as volatile chlorides. The treatment is described in copending application Serial No. 849,199, filed October 28, 1959.

A catalyst is treated with molecular oxygen-containing gas after regeneration according to conventional regeneration procedures until the carbon content is preferably less than about 0.5%. The temperature of the treatment with molecular oxygen-containing gas is generally in the range of about 1000–1800° F. but below a temperature where the catalyst undergoes any substantial deleterious change in its physical or chemical characteristics, and is continued at least long enough to convert a substantial amount of vanadium to a higher valence state, as evidenced by a significant increase, say at least about 10%, preferably at least about 100%, in vanadium removal in subsequent stages of the process. This increase is over and above that which would have been obtained by the other metals removal steps without the oxygen treatment.

The treatment of the vanadium-poisoned catalyst with molecular oxygen-containing gas is preferably performed at a temperature of about 1150 to 1350 or even as high as 1600° F. Little or no effect on vanadium removal is accomplished by treatment at temperatures significantly below about 1000° F., even for an extended time. The upper temperature, to avoid undue catalyst damage, will usually not materially exceed about 1600 or 1800° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment to a time just long enough not to damage the catalyst.

The oxygen-containing gas used in the treatment contains molecular oxygen as the essential active ingredient. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen.

The metal-contaminated catalyst is then sulfided and oxygen-steam treated according to the procedure of the instant invention and heretofore disclosed. This oxidizing treatment is followed by an aqueous wash primarily for the removal of the dispersible forms of the metal contaminants obtained in the previous oxidizing step. These dispersible compounds may take, primarily, the form of metal sulfates but other dispersible compounds may also be present and will be eliminated from the catalyst in this aqueous wash. The wash solution utilized is preferably slightly acidic to enhance the nickel and iron removal by inhibiting the hydrolysis of the metal components formed in the prior oxidizing step.

After the aqueous wash step the catalyst substantially reduced in metal contaminants may be subjected to a basic aqueous wash for vanadium removal. The pH of this wash is frequently greater than about 7.5 and the solution contains ammonium ions. The solution should be substantially free, before contact with the catalyst, of any contaminant materials which would remain deposited on the catalyst. Such contaminant materials include the alkali metals, as well as the heavy poisoning metals. The ammonium ions may be $NH_4^+$ ions or organic-substituted $NH_4^+$ ions such as methyl ammonium and quaternary hydrocarbon radical ammoniums.

The aqueous wash solution can be prepared by addition of a dry reagent or a concentrated solution of the reagent to water, preferably distilled or deionized water. Ammonia or methylamine gas may be dissolved directly in water. The preferred solutions have a pH of about 8 to 11.

In accordance with one embodiment of the present invention to remove nickel in conjunction with vanadium removal, the contaminated catalyst is initially regenerated to reduce or eliminate the carbon content treated with molecular oxygen-containing gas, sulfided by contacting the metal-contaminated catalyst with a volatile sulfide such as $H_2S$, $CS_2$ or a mercaptan, treated with a mixture of oxygen-containing gas and steam, subjected to an aqueous wash that may be made slightly acidic, followed by a basic aqueous wash for vanadium removal.

In practice, the actual time or extent of treating in the several steps of our process depends on various factors and is controlled by the operator according to the situation he faces, e.g., the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawn from the conversion system and quick passage through a mild demetallization procedure may suffice as readily as a more intensive demetallization at a slower rate to keep the total of poisoning metals in the conversion reactor within the tolerance of the unit for poison.

The catalyst to be treated may be removed from the hydrocarbon conversion system—that is, the stream of catalyst which in most conventional procedures is cycled between conversion and regeneration operations—before the poison content reaches about 200–10,000 p.p.m., the poisoning metals being calculated as their common oxides, for instance when the Ni contaminant has reached a level of about 200–700 p.p.m. or when V has reached a level of about 1000–10,000 p.p.m. A suitable amount, generally a very small portion of the catalyst, is removed from the hydrocarbon conversion system and subjected to demetallization. With a continuously circulating catalyst stream, such as in the ordinary "fluid" system this may conveniently be done by the intermittent or continuous removal of a slip-stream of catalyst from the regenerator standpipe. The amount of Ni, V and/or Fe removed in practicing the procedures outlined or the proportions of each which are removed may be varied by proper choice of treating conditions. It may prove necessary, in the case of very severely poisoned catalysts, to repeat one or more treatments to reduce the metals to an acceptable level, perhaps with variations where one metal is greatly in excess. A further significant advantage of the process lies in the fact that the overall metals removal operation, even if repeated, does not unduly deleteriously affect the activity, selectivity, pore structure and other desirable characteristics of the catalyst.

In practice, the process of this invention can be applied in a refinery by removing a portion of catalyst from the regenerator of the cracking system after a conventional regeneration treatment to remove a good part of the carbon, sulfiding the metal contaminated catalyst, converting the metal sulfides to water-dispersible forms by contact with a stream of oxygen-containing gas and steam, slurrying the catalyst in an aqueous wash, neutral or slightly acidic, to remove the dispersible metal compounds and returning the treated catalyst to the hydrocarbon conversion unit, for example, to the regenerator. The treated catalyst may be dried and calcined prior to reuse in the conversion operation, thus reducing significantly the new catalyst requirement.

The following examples are illustrative of the invention but should not be considered limiting.

EXAMPLE I

A "Nalcat" synthetic silica-alumina cracking catalyst is used in a plant operation for the cracking conversion of a petroleum gas oil hydrocarbon stock to gasoline. The feedstock comprises a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend has a gravity (API) of 24°, a carbon residue of about 0.3 weight percent and a boiling range of about 500 to 1000° F. When this catalyst has an iron content of 0.398%, a nickel content of 332 p.p.m. and a vanadium content of 4366 p.p.m., measured as the common oxide, a portion is removed from hydrocarbon conversion system after regeneration, heated in air for 1 hour at 1300° F. and is purged with nitrogen while cooling to 1175° F. The regenerated catalyst is then held for 1 hour at 1175° F. in a bed fluidized with hydrocarbon sulfide. The sulfided catalyst is cooled to 500° F. in an inert gas and then fluidized with a stream containing about 90% steam and 10% air for 15 minutes at 500° F. The oxidized catalyst is discharged into a weak aqueous solution of nitric acid containing about 5 lbs. of $HNO_3$ per ton of catalyst, the slurry solids content being 10% by weight. The slurry is stirred 5 minutes, then filtered and washed free of the dispersible iron and nickel compounds. The washed catalyst is then slurried for 10 minutes in an aqueous solution of $NH_4OH$, equivalent to 10 lbs. $NH_3$ per ton of catalyst. This slurry is filtered and the cake washed free of soluble vanadium compounds. The percentage figures reported for metals removal are found in Table I. After drying and calcination for 2½ hours at about 1050° F. a portion of this sample is used for test cracking a 500–700° F. ASTM distillation range, 34° API gravity East Texas gas oil with results as shown in Table I.

*Table I*

|  | Metals Contaminant before treatment | Metals Contaminant after treatment |
| --- | --- | --- |
| P.p.m. NiO | 332 | 138 |
| P.p.m. $V_2O_5$ | 4366 | 3155 |
| Percent Fe | 0.398 | .244 |
| Percent Metal Removal: |  |  |
| Ni |  | 58.5 |
| V |  | 27.8 |
| Fe |  | 38.7 |
| Cracking Results: |  |  |
| Relative Activity | 35.5 | 37.9 |
| Distillate+Loss | 33.5 | 34.8 |
| Gas Factor | 1.56 | 1.38 |
| Coke Factor | 1.18 | 1.09 |
| Gas Gravity | 1.09 | 1.19 |

The results show that satisfactory metals removal and improved catalyst performance can be obtained by the method of this invention in the substantial reduction in poisoning metals on the catalyst and the significant increase in catalyst activity.

It is claimed:

1. A method for producing gasoline in a hydrocarbon cracking system having a catalytic cracking zone and a catalyst regeneration zone which comprises cracking at elevated temperature in said cracking zone a hydrocarbon feedstock heavier than gasoline and containing nickel contaminant, said cracking being conducted in the presence of a synthetic gel, silica-based hydrocarbon cracking catalyst and during which cracking the catalyst becomes contaminated with nickel of said hydrocarbon feedstock, cycling the catalyst between the cracking zone and the catalyst regeneration zone in which latter zone carbon is removed from the catalyst, bleeding a portion of the nickel contaminated catalyst from the cracking system, sulfiding said nickel contaminated catalyst by contacting bled catalyst at a temperature of about 500 to 1600° F. with a vaporous sulfiding agent, converting nickel contaminants to a form dispersible in an essentially aqueous medium by contact of the sulfided catalyst at a temperature of about 220 to 1150° F. with a mixture of steam and molecular oxygen-containing gas containing at least about 50% and about 0.01 to 10% oxygen, washing the catalyst with an essentially aqueous medium to remove nickel contaminant and returning to a cracking system catalyst reduced in nickel contaminant.

2. The process of claim 1 wherein the oxygen-containing gas in the mixture employed to oxidize the metal sulfide contaminant is air.

3. The process of claim 1 wherein the mixture of steam and oxygen-containing gas employed to oxidize the metal sulfide contaminant contains about 65–95% steam and about 0.5 to 7% oxygen.

4. The process of claim 1 wherein the metal contaminated catalyst is sulfided with hydrogen sulfide at a temperature of about 800–1200° F.

5. The process of claim 1 wherein the aqueous medium employed to remove the dispersible metal contaminants is made acidic by the addition of nitric acid.

6. The process of claim 1 wherein the sulfided catalyst is treated with a gaseous mixture of steam and air at a temperature of about 400–600° F.

7. The method of claim 1 in which the catalyst is silica-alumina.

8. A method for producing gasoline in a hydrocarbon cracking system having a catalytic cracking zone and a catalyst regeneration zone which comprises cracking at elevated temperature in said cracking zone a hydrocarbon feedstock heavier than gasoline and containing nickel and vanadium contaminant, said cracking being conducted in the presence of a synthetic gel, silica-based hydrocarbon cracking catalyst and during which cracking the catalyst becomes contaminated with nickel and vanadium of said hydrocarbon feedstock, cycling the catalyst between the cracking zone and the catalyst regeneration zone in which latter zone carbon is removed from the catalyst, bleeding a portion of the nickel- and vanadium-contaminated catalyst from the cracking system, contacting bled, substantially carbon-free catalyst for at least about 15 minutes with a gas containing molecular oxygen at a temperature of at least about 1000° F., but below a temperature deleterious to the catalyst to increase subsequent vanadium removal, sulfiding said oxygen-treated catalyst by contact with a vaporous sulfiding agent at a temperature of about 500 to 1600° F., converting metal contaminant to a form dispersible in an essentially aqueous medium by contact of the sulfided catalyst at a temperature of about 220 to 1150° F. with a mixture of steam and molecular oxygen-containing gas containing at least about 50% steam and about 0.01 to 10% oxygen, removing dispersible nickel and vanadium contaminants by contact with an essentially aqueous medium, and returning resulting demetallized catalyst to a hydrocarbon cracking system.

9. The process of claim 8 wherein the catalyst is treated with molecular oxygen-containing gas at a temperature of about 1000–1800° F. prior to sulfiding.

10. The method of claim 8 in which the temperature of contact with molecular oxygen containing gas is about 1150 to 1600° F.

11. The method of claim 10 in which vanadium is removed by contact with a basic essentially aqueous medium.

12. The method of claim 10 in which the catalyst is silica-alumina.

References Cited in the file of this patent

UNITED STATES PATENTS

| 2,129,693 | Houdry | Sept. 13, 1938 |
| 2,414,736 | Gray | Jan. 21, 1947 |
| 2,466,050 | Shabaker et al. | Apr. 5, 1949 |
| 2,481,253 | Snyder | Sept. 6, 1949 |